United States Patent
Zong

(10) Patent No.: US 11,658,932 B2
(45) Date of Patent: May 23, 2023

(54) MESSAGE SENDING METHOD AND TERMINAL DEVICE

(71) Applicant: VIVO MOBILE COMMUNICATION CO., LTD., Guangdong (CN)

(72) Inventor: Jiaying Zong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/383,214

(22) Filed: Jul. 22, 2021

(65) Prior Publication Data

US 2021/0352040 A1  Nov. 11, 2021

Related U.S. Application Data

(63) Continuation of application No. PCT/CN2020/071824, filed on Jan. 13, 2020.

(30) Foreign Application Priority Data

Jan. 25, 2019  (CN) .......................... 201910075839.4

(51) Int. Cl.
*H04L 51/58* (2022.01)
*G06F 3/0482* (2013.01)
*H04W 4/12* (2009.01)

(52) U.S. Cl.
CPC ............ *H04L 51/58* (2022.05); *G06F 3/0482* (2013.01); *H04W 4/12* (2013.01)

(58) Field of Classification Search
CPC ......... H04L 51/58; G06F 3/0482; H04W 4/12
USPC ................................. 709/220, 224, 228, 229
See application file for complete search history.

(56) References Cited

U.S. PATENT DOCUMENTS

| | | | | |
|---|---|---|---|---|
| 8,055,617 | B2* | 11/2011 | Hindawi | G06F 8/65 |
| | | | | 707/636 |
| 8,131,655 | B1* | 3/2012 | Cosoi | H04L 51/212 |
| | | | | 706/12 |
| 10,095,390 | B1* | 10/2018 | Lewis | H04N 21/8455 |
| 10,650,621 | B1* | 5/2020 | King | H04L 67/12 |
| 10,856,116 | B1* | 12/2020 | Klein | H04W 4/021 |

(Continued)

FOREIGN PATENT DOCUMENTS

| | | | | |
|---|---|---|---|---|
| CA | 2733583 A1 * | 3/2010 | ............ | G06Q 10/10 |
| CN | 106375967 A | 2/2017 | | |

(Continued)

OTHER PUBLICATIONS

Supplementary European Search Report regarding Patent Application No. 20745560.1-1216/3916529; PCT/CN2020/071824, dated Feb. 10, 2022.

(Continued)

*Primary Examiner* — Khanh Q Dinh

(57) ABSTRACT

A message sending method includes: receiving a first input of a user on a target icon, where the target icon is used to indicate a target application; displaying a target interface in response to the first input, where the target interface includes at least one message, and each of the at least one message corresponds to at least one contact; receiving a second input of the user on a first message, the first message is a message in the at least one message; and sending, in response to the second input via the target application, the first message to at least one first contact corresponding to the first message.

12 Claims, 16 Drawing Sheets

(56) References Cited

U.S. PATENT DOCUMENTS

| | | | |
|---|---|---|---|
| 2010/0297981 A1 | | 11/2010 | Ballantyne et al. |
| 2011/0296379 A1* | | 12/2011 | McCready ............... G06F 9/448 |
| | | | 717/121 |
| 2013/0013719 A1* | | 1/2013 | Anderson ............. H04L 51/214 |
| | | | 709/206 |
| 2016/0269330 A1* | | 9/2016 | McEvoy ................. H04L 63/08 |
| 2016/0310353 A1* | | 10/2016 | Barasch ................. A61H 19/00 |
| 2017/0336948 A1 | | 11/2017 | Chaudhri et al. |
| 2018/0375934 A1 | | 12/2018 | Larabie-Belanger |
| 2020/0020356 A1* | | 1/2020 | Smith .................... G11B 19/18 |
| 2020/0314664 A1* | | 10/2020 | Zhou ..................... H04L 5/0051 |
| 2021/0225186 A1* | | 7/2021 | Yang ....................... G06F 3/013 |
| 2021/0352040 A1* | | 11/2021 | Zong ........................ H04W 4/12 |
| 2022/0214446 A1* | | 7/2022 | Graham .................. G01S 7/003 |
| 2022/0230457 A1* | | 7/2022 | Buscemi ............. G06V 20/586 |

FOREIGN PATENT DOCUMENTS

| | | |
|---|---|---|
| CN | 107045418 A | 8/2017 |
| CN | 107370662 A | 11/2017 |
| CN | 107831964 A | 3/2018 |
| CN | 107846507 A | 3/2018 |
| CN | 108063875 A | 5/2018 |
| CN | 108156329 A | 6/2018 |
| CN | 108415657 A | 8/2018 |
| CN | 108540645 A | 9/2018 |
| CN | 108650420 A | 10/2018 |
| CN | 108897482 A | 11/2018 |
| CN | 109067975 A | 12/2018 |
| CN | 109194829 A | 1/2019 |
| CN | 109871164 A | 6/2019 |
| EP | 3255869 A1 | 12/2017 |

OTHER PUBLICATIONS

International Search Report and Written Opinion of the International Searching Authority regarding International Patent Application No. PCT/CN2020/071824, dated Apr. 1, 2020. Translation provided by Bohui Intellectual Property.

First Office Action regarding Chinese Patent Application No. 201910075839.4, dated Jun. 2, 2020. Translation provided by Bohui Intellectual Property.

Notification to Grant Patent Right for Invention regarding Chinese Patent Application No. 201910075839.4, dated Sep. 16, 2020. Translation provided by Bohui Intellectual Property.

* cited by examiner

US 11,658,932 B2

MESSAGE SENDING METHOD AND TERMINAL DEVICE

CROSS-REFERENCE TO RELATED APPLICATIONS

This application is a Bypass Continuation Application of PCT/CN2020/071824, filed on Jan. 13, 2020, which claims priority to Chinese Patent Application No. 201910075839.4, filed on Jan. 25, 2019, which are incorporated herein by reference in their entirety.

TECHNICAL FIELD

Embodiments of the present disclosure relate to the field of communications technologies, and in particular, to a message sending method and a terminal device.

BACKGROUND

With rapid development of communications technologies, terminal devices are increasingly widely used, and users have increasingly high performance requirements for terminal devices.

SUMMARY

According to a first aspect, an embodiment of the present disclosure provides a message sending method, where the method includes: receiving a first input of a user on a target icon, where the target icon is used to indicate a target application; displaying a target interface in response to the first input, where the target interface includes at least one message, and each of the at least one message corresponds to at least one contact; receiving a second input of the user on a first message, where the first message is a message in the at least one message; and sending, in response to the second input via the target application, the first message to at least one first contact corresponding to the first message.

According to a second aspect, an embodiment of the present disclosure provides a terminal device, where the terminal device includes a receiving module, a display module, and a sending module, where the receiving module is configured to receive a first input of a user on a target icon, where the target icon is used to indicate a target application; the display module is configured to display a target interface in response to the first input received by the receiving module, where the target interface includes at least one message, and each of the at least one message corresponds to at least one contact; the receiving module is further configured to receive a second input of the user on the first message, where the first message is a message in the at least one message; and the sending module is configured to send, in response to the second input received by the receiving module via the target application, the first message to at least one first contact corresponding to the first message.

According to a third aspect, an embodiment of the present disclosure provides a terminal device, where the terminal device includes: a processor, a memory, and a computer program that is stored in the memory and that can run on the processor, where when the computer program is executed by the processor, the steps of the message sending method according to the first aspect are implemented.

According to a fourth aspect, an embodiment of the present disclosure provides a non-transitory computer-readable storage medium, where a computer program is stored in the non-transitory computer-readable storage medium, and when the computer program is executed by a processor, the steps of the message sending method according to the first aspect are implemented.

DETAILED DESCRIPTION OF EMBODIMENTS

Figure 1:
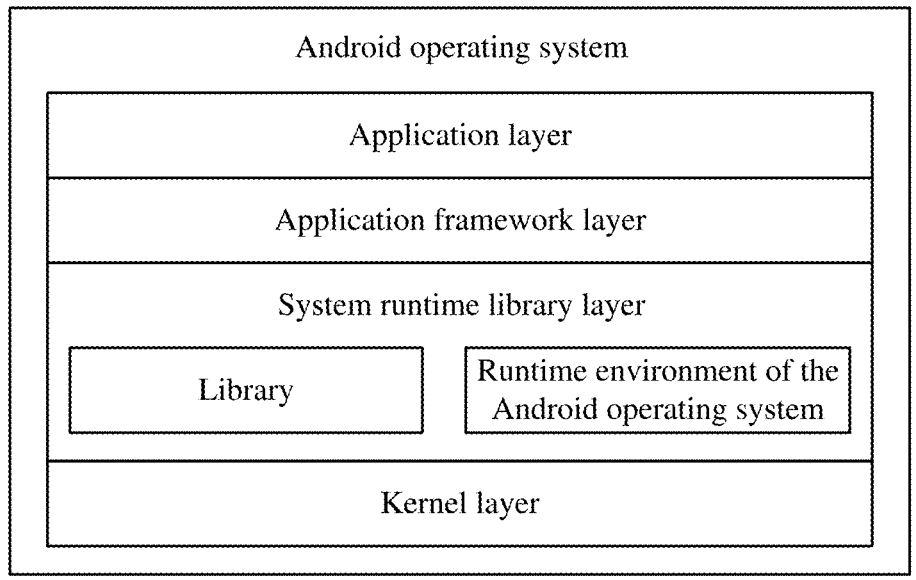
FIG. 1 is a schematic architectural diagram of an Android operating system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of this application. All other embodiments obtained by a person of ordinary skill in the art based on the embodiments of this application shall fall within the protection scope of this application.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, AB indicates A or B.

In the specification and claims of the present disclosure, the terms such as "first" and "second" are used to distinguish between different objects, but are not used to describe a particular sequence of the objects. For example, a first input, a second input, and the like are used to distinguish between different inputs, but are not used to describe a particular sequence of the inputs.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the description of the embodiments of the present disclosure, unless otherwise specified, the meaning of "a plurality of" means two or more. For example, a plurality of processing units mean two or more processing units.

According to a message sending method and a terminal device provided in the embodiments of the present disclosure, a first input of a user on a target icon (used to indicate a target application) can be received; a target interface (the target interface includes at least one message, and each of the at least one message corresponds to at least one contact) is displayed in response to the first input; a second input of the user on a first message (a message in the at least one message) is received; and the first message is sent, in response to the second input via the target application, to at least one first contact corresponding to the first message. In this solution, after the user performs the first input on the target icon indicating the target application, the terminal device can display pre-edited messages (each of these messages corresponds to at least one contact, namely contacts to which these messages are to be sent) to the user. Therefore, after the user selects a message (that is, the second input of the user) from these messages, the terminal device can be triggered to send the message to a contact corresponding to the message. In this way, when the user sends a message by using the terminal device, steps to be performed by the terminal device to send the message can be reduced, so that the terminal device can quickly send the message, further improving efficiency of the terminal device in sending messages.

The terminal device provided in the embodiments of the present disclosure may be a terminal device with an operating system. The operating system may be an Android operating system, or may be an iOS operating system or other possible operating systems, which is not specifically limited in the embodiments of the present disclosure.

The following uses the Android operating system as an example to introduce a software environment applicable to the message sending method provided by the embodiments of the present disclosure.

FIG. 1 is a schematic architectural diagram of a possible Android operating system according to an embodiment of the present disclosure. In FIG. 1, the architecture of the Android operating system includes four layers, namely: an application layer, an application framework layer, a system runtime library layer, and a kernel layer (it may be a Linux kernel layer).

The application layer includes various applications in the Android operating system (including system applications and third-party applications).

The application framework layer is the framework of applications. Developers can develop some applications based on the application framework layer while complying with the development principle of the application framework.

The system runtime library layer includes a library (also called a system library) and a runtime environment of the Android operating system. The library mainly provides various resources needed by the Android operating system. The runtime environment of the Android operating system is used to provide a software environment for the Android operating system.

The kernel layer is the operating system layer of the Android operating system and belongs to the lowest layer of software hierarchy of the Android operating system. The kernel layer provides core system services and hardware-related drivers for the Android operating system based on the Linux kernel.

The Android operating system is used as an example. In the embodiments of the present disclosure, based on the system architecture of the Android operating system as shown in FIG. 1, developers can develop software programs that implement the message sending method provided by the embodiments of the present disclosure, so that the message sending method can be performed based on the Android operating system shown in FIG. 1. That is, by running the software program in the Android operating system, the processor or the terminal device can implement the message sending method provided by the embodiments of the present disclosure.

The terminal device provided in the embodiments of the present disclosure may be a mobile terminal, or may be a non-mobile terminal. For example, the mobile terminal may be a mobile phone, a tablet computer, a laptop computer, a palmtop computer, an in-vehicle terminal, a wearable device, an ultra-mobile personal computer (UMPC), a netbook, a personal digital assistant (PDA), or the like, and the non-mobile terminal may be a personal computer (PC), a television (TV), a teller machine, a self-sevice machine, or the like, which is not specifically limited in the embodiments of the present disclosure.

The executor of the message sending method provided in the embodiments of the present disclosure may be the terminal device, or may be a functional module and/or a functional entity that can implement the message sending method in the terminal device. This may be specifically determined based on an actual usage requirement and is not limited in the embodiments of the present disclosure. The following uses a terminal device as an example to provide exemplary description of the message sending method provided in the embodiments of the present disclosure.

When using a terminal device to send a message to a contact, a user needs to trigger the terminal device to perform multiple steps to send the message to the contact. Specifically, when sending a message by using the terminal device, the user needs to trigger the terminal device to perform the following steps: After the user triggers the terminal device to start an application for sending messages, the terminal device displays an interface corresponding to the application; the user then enters content of a to-be-sent message, and chooses a contact who is to receive the message; and finally, the user triggers the terminal device again to send the message to the contact.

However, in the foregoing message sending method, the terminal device needs to perform the multiple steps to send the message to the contact. That is, the terminal device takes relatively more steps to send the message. Consequently, the terminal device cannot quickly send the message, resulting in a low efficiency of the terminal device in sending messages.

In the embodiments of the present disclosure, when the user sends a message by using the terminal device, the user can trigger, via an input, the terminal device to display a first interface (the first interface includes at least one icon of an application having a communication function), then the user can trigger, via a specified input (for example, a first input) on an icon (hereinafter referred to as target icon) of an application (an application having a communication function, hereinafter referred to as target application) in the first interface, the terminal device to display an interface (hereinafter referred to as target interface) including at least one message. Each of the at least one message corresponds to at least one contact. Therefore, the user can trigger, via a selection input (hereinafter referred to as second input) on a message (for example, a first message) of the at least one message, the terminal device to send the message to at least one contact (for example, at least one first contact) corresponding to the message.

Optionally, in the embodiments of the present disclosure, the first interface may be a home screen (also referred to as desktop) of the terminal device.

The following provides exemplary description of the message sending method provided in the embodiments of the present disclosure with reference to the accompanying drawings.

Figure 2:
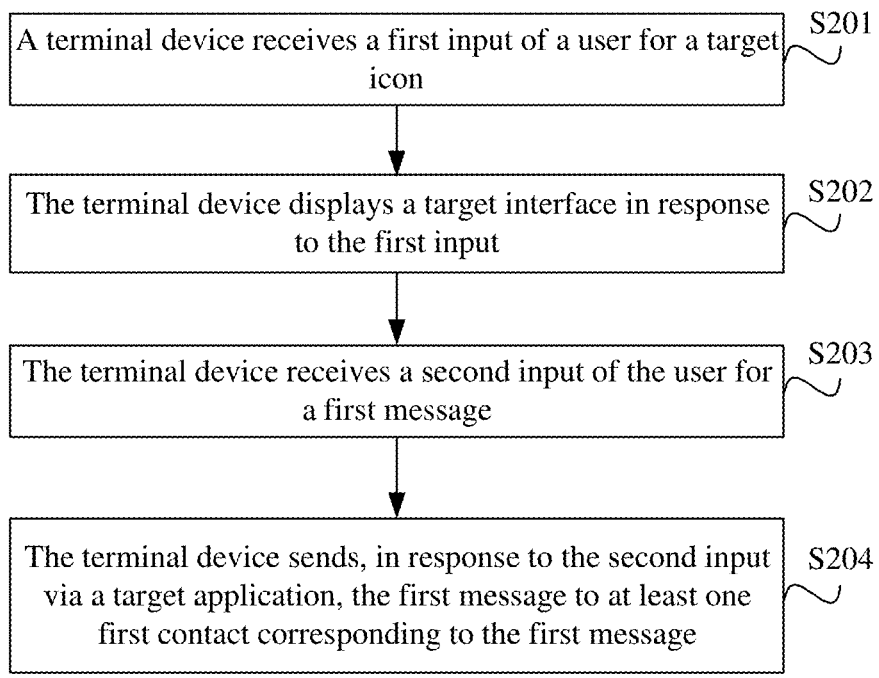
FIG. 2 is a schematic diagram 1 of a message sending method according to an embodiment of the present disclosure.

As shown in FIG. 2, an embodiment of the present disclosure provides a message sending method. The method may include the following steps S201 to S204.

S201: A terminal device receives a first input of a user on a target icon.

The target icon may be used to indicate a target application.

In this embodiment of the present disclosure, when the user sends a message by using the terminal device, the user can trigger, via an input, the terminal device to display the first interface, and then the user can trigger, via a first input on an icon (namely, the target icon) of an application (namely, the target application) having a communication function, the terminal device to display an interface (hereinafter referred to as target interface) including at least one message.

It may be understood that in this embodiment of the present disclosure, the target application may be an application having a communication function. The at least one message may be a pre-edited message.

Optionally, in this embodiment of the present disclosure, the first input may be any possible input such as a deep-press input (namely, a three-dimensional touch (3D touch) input), a single-click input, a double-click input, or a long-press input of the user on the target icon. This may be specifically determined according to an actual usage requirement, and is not limited in the embodiments of the present disclosure.

For example, in this embodiment of the present disclosure, it is assumed that the first input is a deep-press input. A pressure threshold can be preset on the terminal device. If the terminal device detects that a pressure value of a deep-press input of the user on a target icon is greater than or equal to the pressure threshold, it can be determined that the terminal device receives the first input of the user on the target icon.

Optionally, in this embodiment of the present disclosure, the pressure threshold may be a value preset on the terminal device. The pressure threshold may be preset by the manufacturer of the terminal device on the terminal device based on performance of the terminal device. This may be specifically determined according to an actual usage requirement, and is not limited in the embodiments of the present disclosure.

S202: The terminal device displays a target interface in response to the first input.

The target interface may include at least one message, and each of the at least one message may correspond to at least one contact.

In this embodiment of the present disclosure, after receiving the first input of the user on the target icon, the terminal device can display the target interface (including at least one pre-edited message) in response to the first input.

Optionally, in this embodiment of the present disclosure, the target interface may be displayed on the first interface in an overlapping manner.

Optionally, in this embodiment of the present disclosure, the target interface may be a sliding interface. In this way, when the terminal device cannot display the at least one message on the target interface at a time, the user can trigger, via any possible sliding input such as a leftward sliding input, a rightward sliding input, an upward sliding input, or a downward sliding input on the target interface, the terminal device to display another message that is not displayed, so that the user can view these messages.

Optionally, in this embodiment of the present disclosure, each of the at least one message may include at least one of content information or location information. Content information of one message includes at least one of text information, image information, emoticon information, or voice information. The location information indicates a real-time location of the terminal device.

Optionally, in this embodiment of the present disclosure, each message may include only content information or only location information, or may include both content information and location information. This may be specifically determined according to an actual usage requirement, and is not limited in the embodiments of the present disclosure.

Figure 3A:
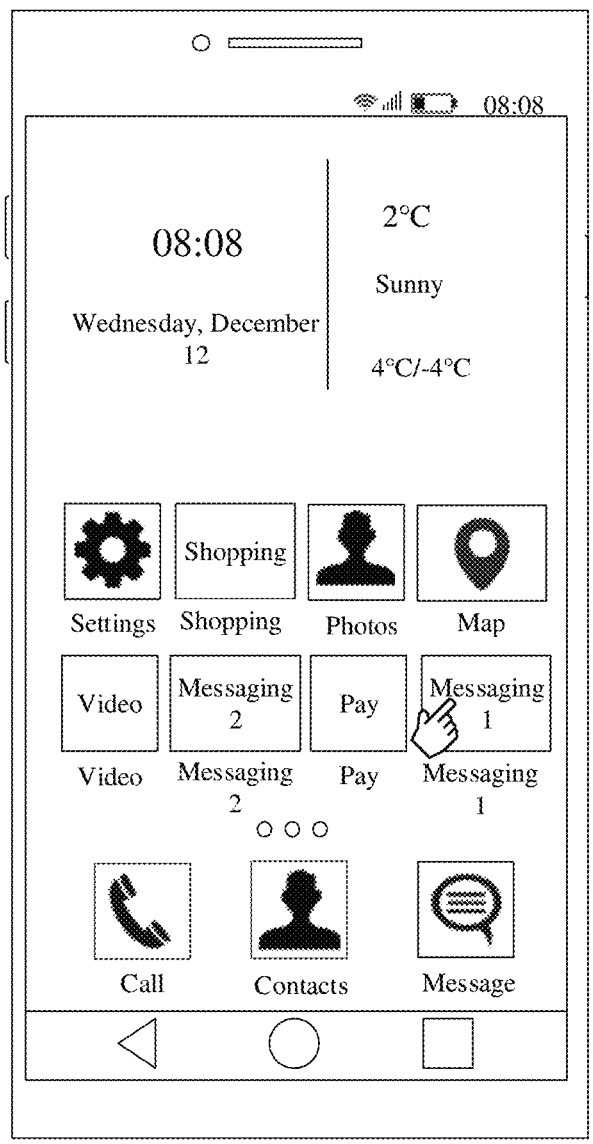
FIG. 3A is schematic diagram 1 of an interface to which a message sending method according to an embodiment of the present disclosure is applied.
Figure 3B:
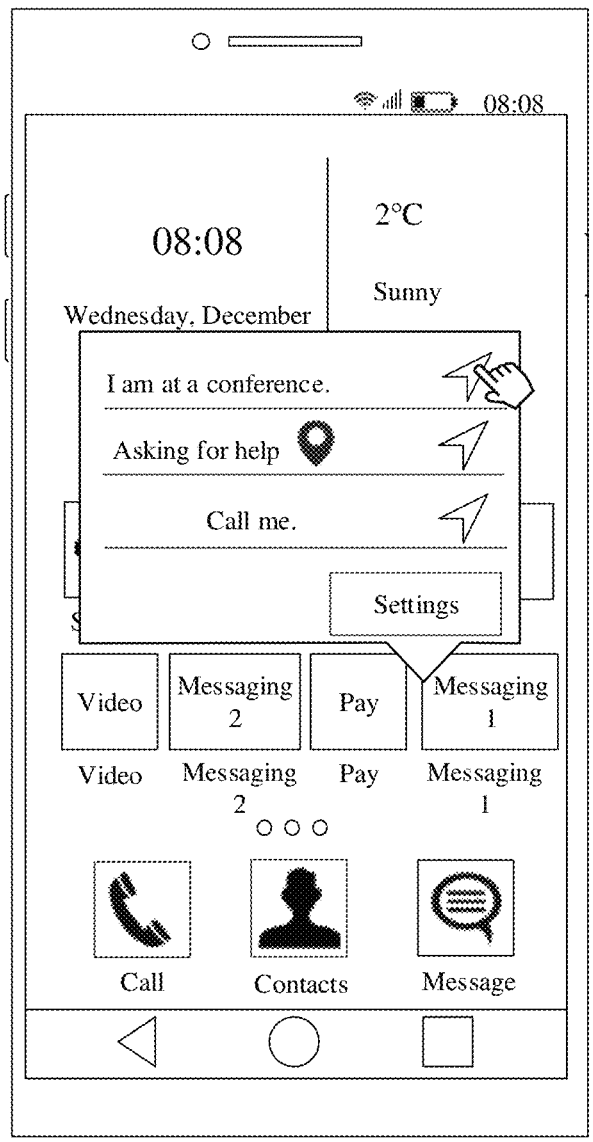
FIG. 3B is schematic diagram 2 of an interface to which a message sending method according to an embodiment of the present disclosure is applied.

For example, as shown in FIG. 3, in this embodiment of the present disclosure, it is assumed that the first interface is a home screen of the terminal device, the target icon is an icon "Messaging 1", and the first input is a deep-press input of the user on the target icon. As shown in FIG. 3A, after receiving a deep-press input (namely, the first input) of the user on the icon "Messaging 1", the terminal device can display an interface (namely, the target interface) on the home screen of the terminal device in an overlapping manner in response to the first input, as shown in FIG. 3B. The interface includes three messages: "I am at a conference.", "Asking for help +an identifier of location information", and "Call me." The messages "I am at a conference." and "Call me." each include only content information. The message "Asking for help+an identifier of location information" includes both content information and location information (the content information is "Asking for help", and the location information is indicated by a map marker or location identifier (namely, the identifier of the location information)) shown in FIG. 3B.

In this embodiment of the present disclosure, at least one contact corresponding to each message may be at least one contact that corresponds to the message and that is set by the user on the terminal device, namely, an object to which the message is to be sent.

Optionally, in this embodiment of the present disclosure, each of the at least one contact may be a contact, or may be a contact group. This may be specifically determined according to an actual usage requirement, and is not limited in the embodiments of the present disclosure.

It should be noted that, in this embodiment of the present disclosure, when the user uses the message sending method provided in this embodiment of the present disclosure to send a message for the first time, that is, when the terminal device responds to the first input for the first time, the terminal device can display prompt information on the target interface, to prompt the user to set a to-be-sent message. Optionally, the prompt information may be "Please set up a message you want to send." In this way, the user can set a to-be-sent message (for example, the at least one message), so that these messages can be included in the target interface.

S203: The terminal device receives a second input of the user on a first message.

The first message may be a message in the at least one message.

S204: The terminal device sends, in response to the second input via a target application, the first message to at least one first contact corresponding to the first message.

In this embodiment of the present disclosure, after displaying the target interface, the terminal device can receive a second input of the user on a message (namely, the first message) of the at least one message, and send, in response to the second input via the target application, the first message to at least one contact (namely, the at least one first contact) corresponding to the first message.

Optionally, in this embodiment of the present disclosure, the second input may include inputs in two manners. The two manners may be manner 1 and manner 2 listed below. The following provides exemplary description of each of the two manners (manner 1 and manner 2) of the second input.

Manner 1: Each of the at least one message included in the target interface corresponds to one sending control, and the second input may be an input of the user on a first sending control corresponding to the first message.

Optionally, in this embodiment of the present disclosure, the second input may be any possible input such as a single-click input, a double-click input, or a long-press input of the user on the first sending control. This may be specifically determined according to an actual usage requirement, and is not limited in the embodiments of the present disclosure.

For example, in this embodiment of the present disclosure, it is assumed that the first message is the message "I am at a conference", and the first sending control is a sending control corresponding to the message "I am at a conference". The second input may be a single-click input of the user on the first sending control. As shown in FIG. 3B, after receiving a single-click input (namely, the second input) of the user on a sending control (namely, the first sending control) corresponding to the message "I am at a conference", the terminal device can send, in response to the second input, the message "I am at a conference" to at least one contact (namely, the at least one first contact) corresponding to the message "I am at a conference."

Manner 2: The second input is a selection input of the user on the first message.

Optionally, in this embodiment of the present disclosure, the second input may be an input following the first input, that is, there is no time interval between the first input and the second input, in other words, an end time point of the first input is a start time point of the second input, or an end position of the first input is a start position of the second input. Optionally, when the user triggers, via a first input of a finger on the target icon, the terminal device to display the target interface, the user can hold the finger and directly move the finger from a position where the target icon is located to a position where the to-be-sent first message (that is, the user selects the first message as a to-be-sent message) is located. Then, after the user moves away the finger, the terminal device can send the first message to at least one contact corresponding to the first message, namely, the at least one first contact.

Optionally, in this embodiment of the present disclosure, if the user needs to reselect a to-be-sent message after moving the finger from the position where the target icon is located to the position where the first message is located, the user can hold the finger, move the finger from the position where the first message is located to a position outside the target interface, and further move the finger to another message (hereinafter referred to as second message), to reselect a to-be-sent message. In this way, after the user moves away the finger, the terminal device can send the second message to at least one contact corresponding to the second message.

Optionally, in this embodiment of the present disclosure, when receiving an input of the user on the first message, the terminal device can display content of the first message with a target effect.

Optionally, in this embodiment of the present disclosure, the target effect may be any one, two or more combined effects such as changing a display color of content of the first message, changing a font size of content of the first message, and changing a background color of a display area of content of the first message. This may be specifically determined according to an actual usage requirement, and is not limited in the embodiments of the present disclosure.

For example, in this embodiment of the present disclosure, that the target effect is changing a background color of a display area of the first message is used as an example. It is assumed that before the terminal device receives the second input of the user on the first message, the background color of the display area of the first message is white. After the terminal device receives the second input of the user on the first message, the terminal device can change the background color of the display area of the first message, for example, change the background color of the display area of the first message from white to gray.

Optionally, in this embodiment of the present disclosure, if each of the at least one message may include content information and location information (used to indicate a location where the terminal device is located when the terminal device sends a message), when receiving a second input of the user on a message (namely, the first message), the terminal device can first send, in response to the second input, content information (hereinafter referred to as first content information) in the first message to at least one contact (hereinafter referred to as at least one first contact) corresponding to the first message, and send first location information (indicating a location where the terminal device is located when the terminal device receives the second input) to the at least one first contact after sending the first content information to the at least one first contact.

For example, in this embodiment of the present disclosure, step S204 may be implemented by using the following step S204a.

S204a: The terminal device sends first location information to at least one first contact after sending first content information to the at least one first contact.

In this embodiment of the present disclosure, if a to-be-sent message (for example, the first message) selected by the user includes both content information and location information, after receiving a second input of the user on the first message (including first content information and first location information), the terminal device can send, in response to the second input, the first content information to at least one first contact corresponding to the first message, and then send the first location information to the at least one first contact after sending the first content information to the at least one first contact.

Optionally, in this embodiment of the present disclosure, the first location information may be in a form of characters, map, picture, or any other form that can indicate a location of the terminal device. This may be specifically determined according to an actual usage requirement, and is not limited in the embodiments of the present disclosure.

In this embodiment of the present disclosure, if the first message includes first content information and first location information, the terminal device can first send the first content information to at least one first contact corresponding to the first message, and then send the first location information to the at least one first contact after sending the first content information. In this way, after receiving one input (namely, the second input) of the user on the first message, the terminal device can send two messages to at least one first contact corresponding to the first message, so that steps to be performed by the terminal device for sending the messages can be reduced, and the terminal device can quickly send the messages, further improving efficiency of the terminal device in sending messages.

According to the message sending method provided in this embodiment of the present disclosure, after the user performs the first input on the target icon indicating the target application, the terminal device can display pre-edited messages (each of these messages corresponds to at least one contact, namely contacts to which these messages are to be sent) to the user. Therefore, after the user selects a message (namely, the second input of the user) from these messages, the terminal device can be triggered to send the message to a contact corresponding to the message. In this way, when the user sends a message by using the terminal device, steps to be performed by the terminal device for sending the message can be reduced, so that the terminal device can quickly send the message, further improving efficiency of the terminal device in sending messages.

Optionally, in this embodiment of the present disclosure, when the user needs to set at least one message included in the target interface, the user can trigger, via an input (hereinafter referred to as third input) on a setting control in the target interface, the terminal device to display an interface (hereinafter referred to as message setting interface) in which the at least one message can be set. In this way, the user can trigger, via an input on the message setting interface, the terminal device to set the at least one message.

Figure 4:
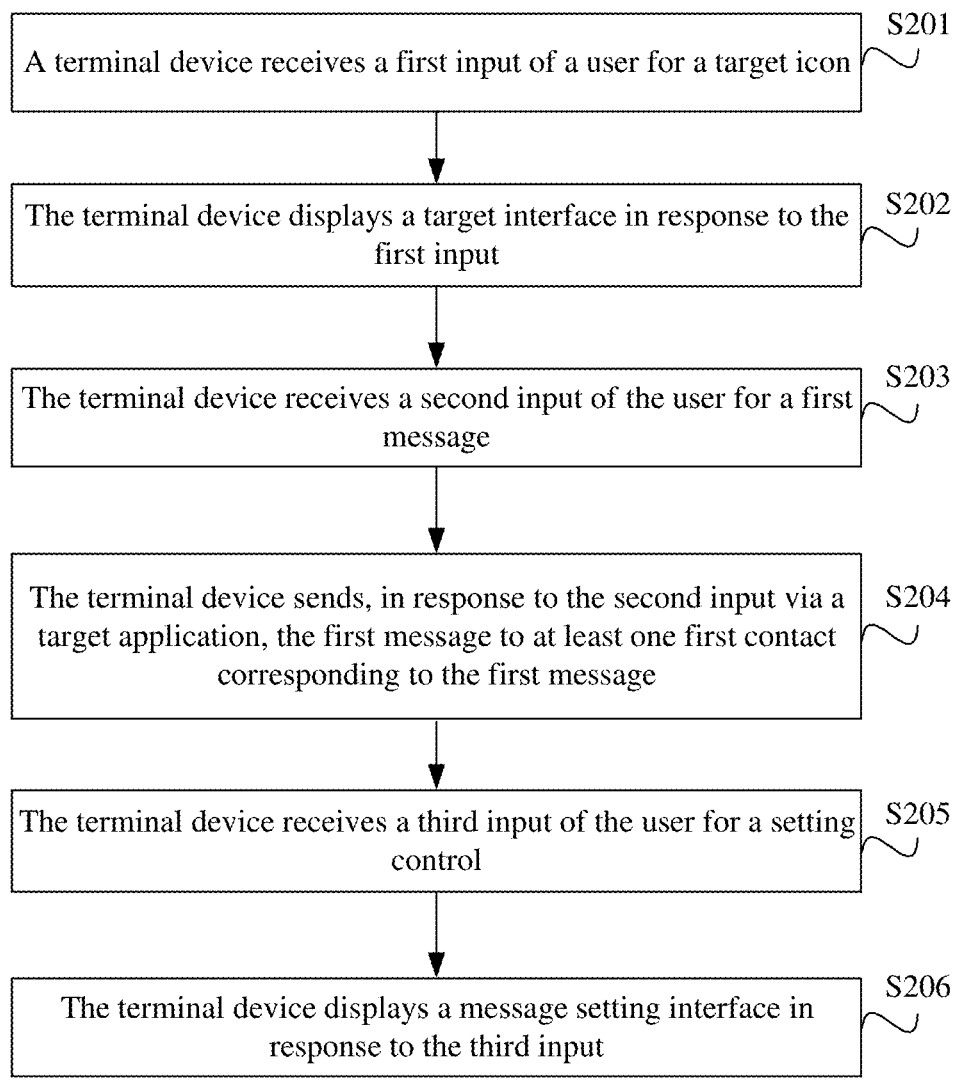
FIG. 4 is a schematic diagram 2 of a message sending method according to an embodiment of the present disclosure.

For example, with reference to FIG. 2, as shown in FIG. 4, after step S202, the message sending method provided in this embodiment of the present disclosure may further include the following steps S205 and S206:

S205: The terminal device receives a third input of the user on a setting control.

S206: The terminal device displays a message setting interface in response to the third input.

The message setting interface may be used to set the at least one message.

In this embodiment of the present disclosure, when displaying the target interface (including a setting control), the terminal device can receive an input (namely, the third input) of the user on the setting control, and display, in response to the third input, an interface (namely, the message setting interface) that may be used to set the at least one message.

Optionally, in this embodiment of the present disclosure, the setting control may be indicated by a setting identifier.

Optionally, in this embodiment of the present disclosure, the setting identifier may be a text identifier, for example, "Settings"; or may be a symbol identifier, for example, a symbol indicating settings; or may be an image identifier, for example, any possible identifier such as an image indicating settings. This may be specifically determined according to an actual usage requirement, and is not limited in the embodiments of the present disclosure.

Figure 5A:
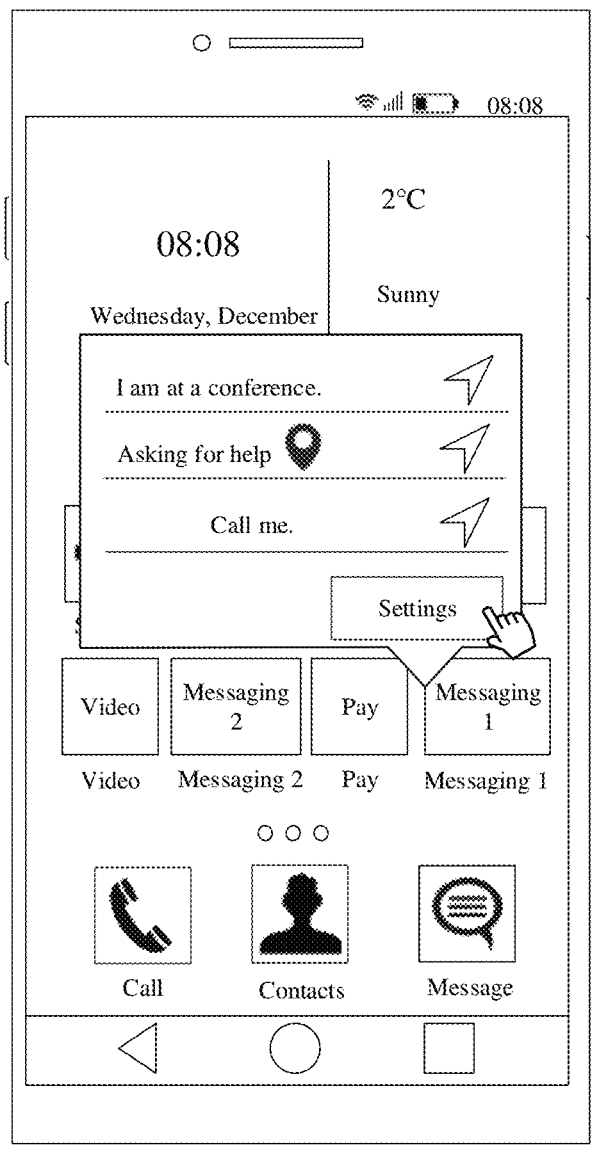
FIG. 5A is a schematic diagram 3 of an interface to which a message sending method according to an embodiment of the present disclosure is applied.

For example, as shown in FIG. 5A, a setting identifier of a setting control in the target interface may be a text identifier "Settings".

Optionally, in this embodiment of the present disclosure, the third input may be any possible input such as a single-click input, a double-click input, or a long-press input of the user on the setting control. This may be specifically determined according to an actual usage requirement, and is not limited in the embodiments of the present disclosure.

Figure 5B:
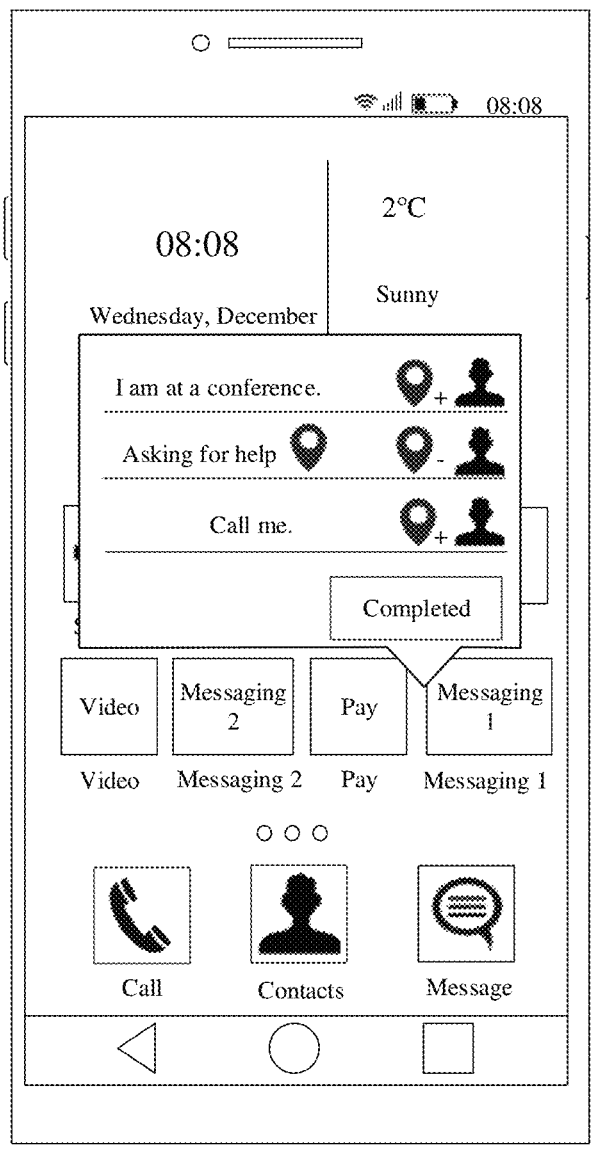
FIG. 5B is a schematic diagram 4 of an interface to which a message sending method according to an embodiment of the present disclosure is applied.

For example, in this embodiment of the present disclosure, as shown in FIG. 5A, after receiving the third input of the user on the setting control, the terminal device can display the message setting interface in response to the third input, as shown in FIG. 5B.

It should be noted that in this embodiment of the present disclosure, a performing sequence of steps S205-S206 and steps S203-S204 is not limited. That is, in this embodiment of the present disclosure, steps S205 and S206 may be performed before steps 5203 and 5204; or steps S203 and S204 may be performed before steps S205 and S206. In FIG. 4, that steps S203 and S204 are performed before steps S205 and S206 is used as an example for description. This may be specifically determined according to an actual usage requirement, and is not limited in the embodiments of the present disclosure.

When steps S203 and S204 are performed before steps S205 and S206 in this embodiment of the present disclosure, the user can trigger the terminal device to edit (for example, modify, and delete) a message that has been set on the message setting interface, or add a message on the message setting interface. This may be specifically determined according to an actual usage requirement, and is not limited in the embodiments of the present disclosure.

In this embodiment of the present disclosure, the user can trigger, via an input (namely, the third input) on a setting control in the target interface, the terminal device to display the message setting interface. In this way, the user can flexibly set a message (for example, set the at least one message) on the message setting interface according to usage requirements of the user.

Optionally, in this embodiment of the present disclosure, the message setting interface may include at least one setting option, each setting option may include a content setting area and a contact control, and the user can trigger, via an input on the content setting area and/or the contact control, the terminal device to generate the at least one message. One of the at least one setting option is taken as an example. The user can trigger, via an input (hereinafter referred to as fourth input) on an object (at least one of the content setting area or the contact control) in the setting option, the terminal device to generate a message corresponding to content in the content setting area of the setting option. That is, after the terminal device generates the message, the message can be included in the target interface.

Figure 6:
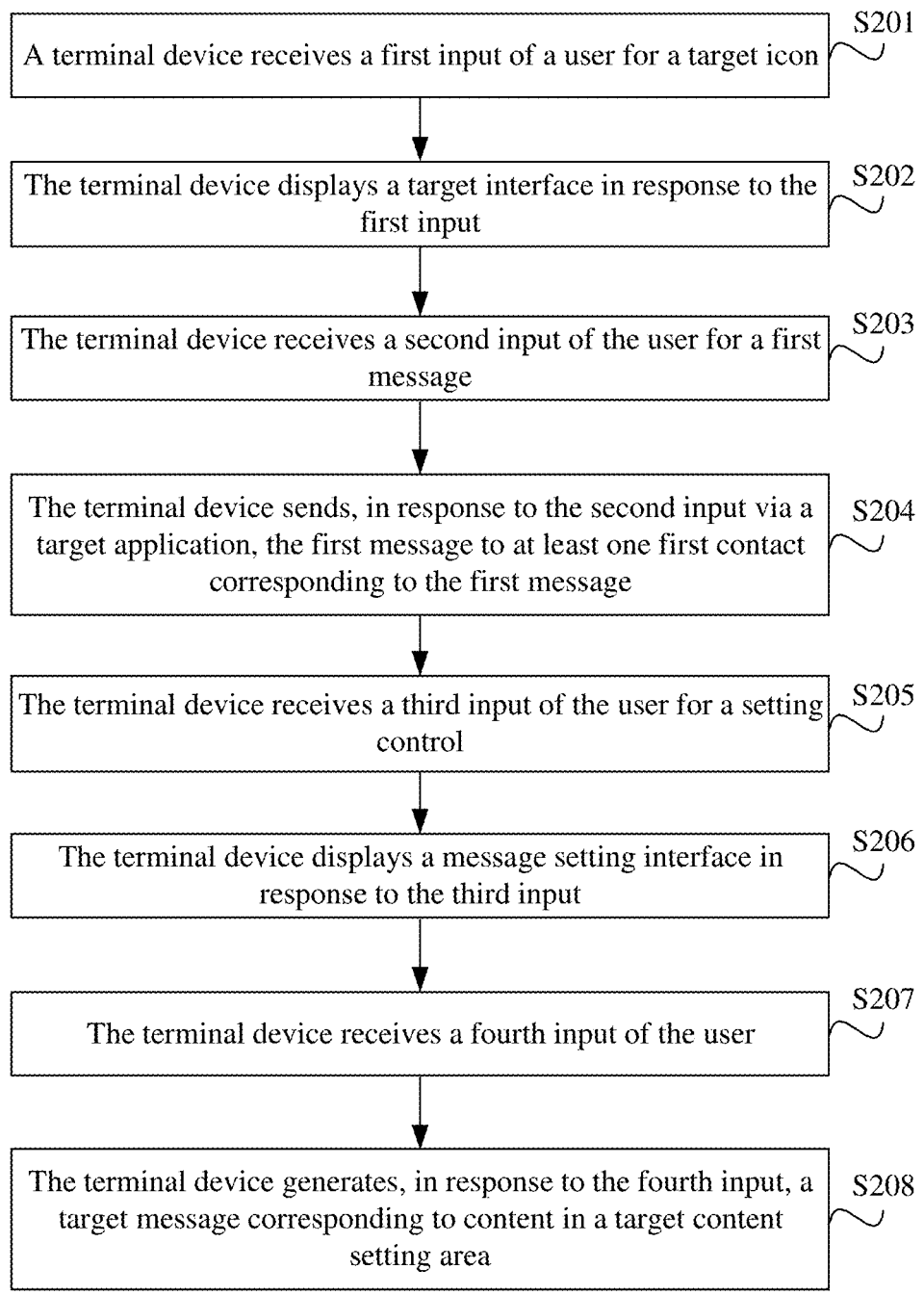
FIG. 6 is a schematic diagram 3 of a message sending method according to an embodiment of the present disclosure.

For example, with reference to FIG. 4, as shown in FIG. 6, after step S206, the message sending method provided in this embodiment of the present disclosure may further include the following steps S207 and S208.

S207: The terminal device receives a fourth input of the user.

The fourth input may be an input of the user on a target object in a target setting option, the target setting option may be a setting option in the at least one setting option, and the target object may include at least one of a content setting area (hereinafter referred to as target content setting area) or a contact control (hereinafter referred to as target contact control).

S208: The terminal device generates, in response to the fourth input, a target message corresponding to content in a target content setting area.

In this embodiment of the present disclosure, the message setting interface includes at least one setting option, and each setting option includes a content setting area and a contact control. One setting option (namely, the target setting option) is used as an example. The terminal device can receive an input (namely, the fourth input) of the user on an object (including at least one of a content setting area or a contact control, hereinafter referred to as target object) in the target setting option, and generate, in response to the fourth input, a message (namely, the target message) corresponding to content in the content setting area of the target setting option.

It should be noted that in this embodiment of the present disclosure, the target setting option is described by using one of the at least one setting option as an example. During specific implementation, the user can trigger, via an input on an object (including at least one of a content setting area or a contact control) of each of the at least one setting option, the terminal device to generate the at least one message.

In this embodiment of the present disclosure, a content setting area in each setting option can be used for the user to enter content information; and a contact control in each setting option can be used for the user to set at least one contact corresponding to each message.

Optionally, in this embodiment of the present disclosure, the fourth input may include a first sub-input and a second sub-input. The first sub-input may be an input of the user on a content setting area (namely, the target content setting area) in the target setting option, and the second sub-input may be an input of the user on a contact control (namely, the target contact control) in the target setting option.

Optionally, in this embodiment of the present disclosure, the first sub-input may be any possible input of the user such as adding, modifying, and deleting content information in the target content setting area. This may be specifically determined according to an actual usage requirement, and is not limited in the embodiments of the present disclosure.

Optionally, in this embodiment of the present disclosure, the second sub-input may be any possible input of the user such as adding, changing, and deleting a contact for content in the target content setting area by using a contact control. This may be specifically determined according to an actual usage requirement, and is not limited in the embodiments of the present disclosure.

Figure 7A:
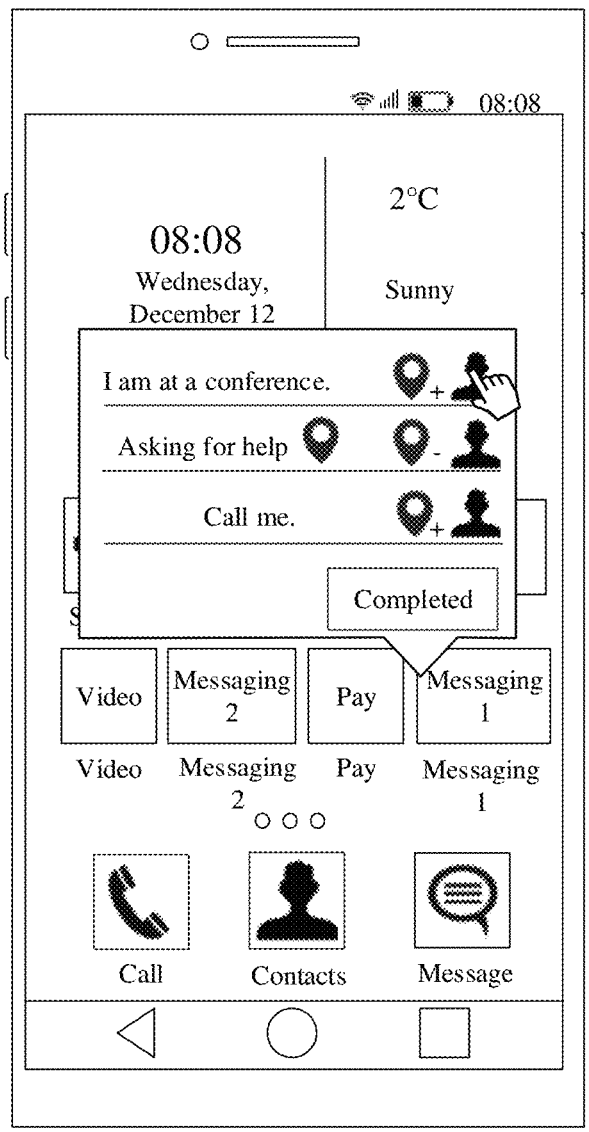
FIG. 7A is schematic diagram 5 of an interface to which a message sending method according to an embodiment of the present disclosure is applied.
Figure 7B:
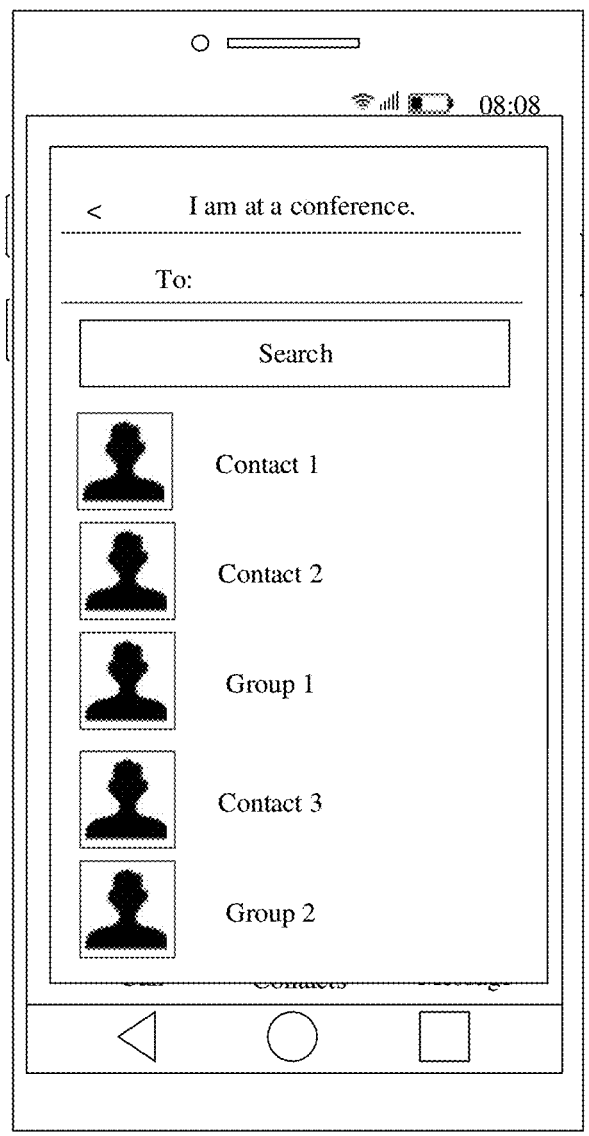
FIG. 7B is schematic diagram 6 of an interface to which a message sending method according to an embodiment of the present disclosure is applied.

For example, the following provides exemplary description of the second sub-input in this embodiment of the present disclosure. As shown in FIG. 7A, after receiving an input of the user on a contact control corresponding to a content setting area including content information "I am at a conference.", the terminal device can display, in response to the input, as shown in FIG. 7B, an interface (hereinafter referred to as contact interface) including a plurality of contacts (the plurality of contacts are contacts in the target application), and then receive an input of the user such as adding, changing, or deleting a contact on the contact interface.

Optionally, in this embodiment of the present disclosure, the contact interface may be a sliding interface. In this way, when the terminal device cannot display the multiple contacts on the contact interface at a time, the user can trigger, via any possible sliding input such as a leftward sliding input, a rightward sliding input, an upward sliding input, or a downward sliding input on the contact interface, the terminal device to display another contact that is not displayed, so that the user can view these contacts.

Optionally, in this embodiment of the present disclosure, the terminal device can display the multiple contacts on the contact interface in a particular sequence. Optionally, the terminal device can display the multiple contacts on the contact interface in descending order of a frequency at which the user contacts each contact via the target application; or in reverse chronological order of time when the user makes last contact with each contact via the target application; or in phonetic alphabetical order of names of the contacts in the target application. This may be specifically determined according to an actual usage requirement, and is not limited in the embodiments of the present disclosure.

Optionally, in this embodiment of the present disclosure, the fourth input may further include an input of the user on a "Completed" control in the message setting interface. When receiving an input of the user on the "Completed" control, the terminal device can generate, in response to the input, a message (namely, the target message) corresponding to content in the target content setting area. After the terminal device generates the target message, the target message can be included in the target interface.

Figure 8A:
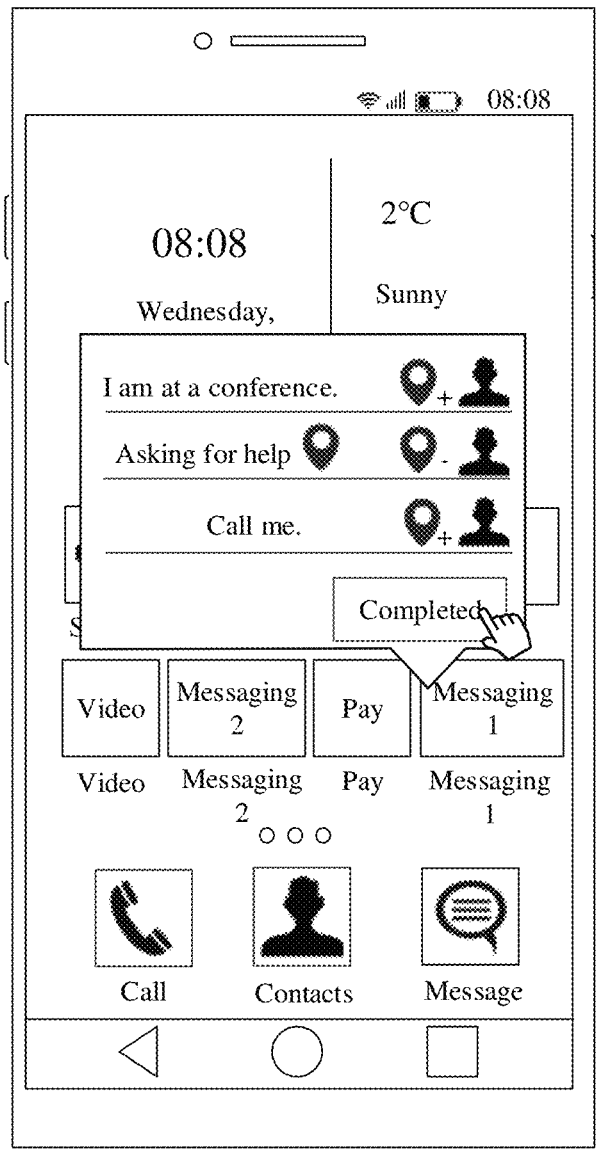
FIG. 8A is schematic diagram 7 of an interface to which a message sending method according to an embodiment of the present disclosure is applied.
Figure 8B:
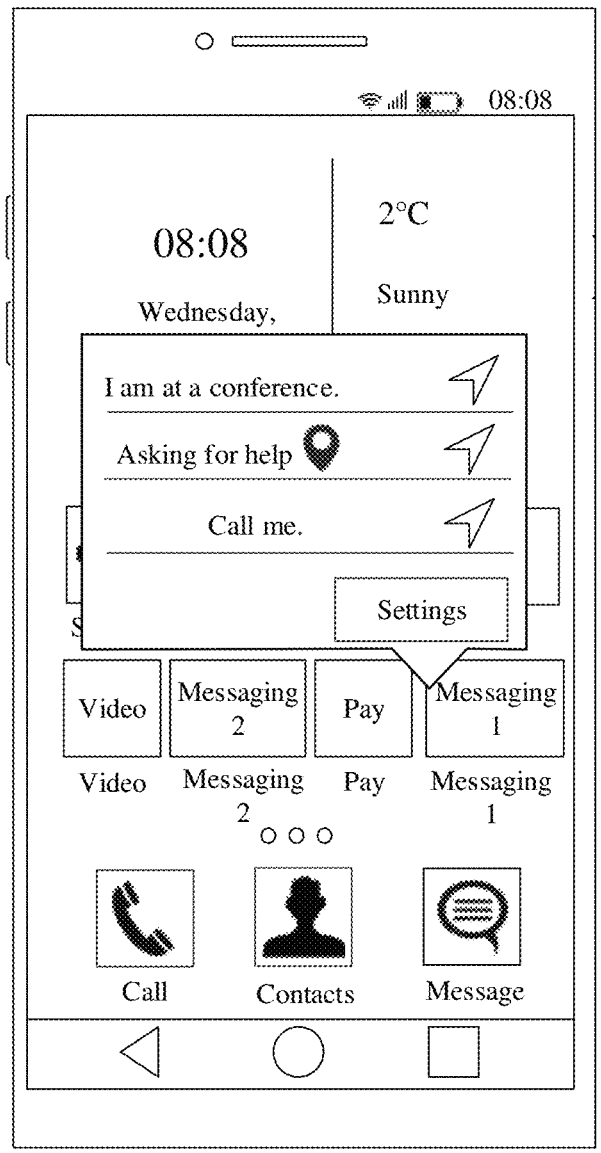
FIG. 8B is schematic diagram 8 of an interface to which a message sending method according to an embodiment of the present disclosure is applied.

For example, in this embodiment of the present disclosure, after the user completes an input on an object in the target setting option in the message setting interface, the terminal device can receive an input of the user on the "Completed" control shown in FIG. 8A, and generate, in response to the input, three messages shown in FIG. 8B. In this way, when receiving the first input of the user on the target icon (used to indicate the target application), the terminal device can display the three messages on the target interface in response to the first input.

In this embodiment of the present disclosure, the user can perform an input on at least one of a content setting area or a contact control in a setting option of a message setting interface, to trigger the terminal device to generate a message corresponding to content in the content setting area in the message setting interface. Therefore, according to usage requirements of the user, the user can set, on the message setting interface, each message and a contact corresponding to each message. After setting at least one message, the user can trigger, via a first input on any message (for example, the target message) in the target interface, the terminal device to send the message to at least one contact corresponding to the message. In this way, steps to be performed by the terminal device for sending the message can be reduced, so that the terminal device can quickly send the message, further improving efficiency of the terminal device in sending messages.

Optionally, in this embodiment of the present disclosure, each setting option in the message setting interface may further include a location control. If the user needs to add location information (hereinafter referred to as target location information) indicating a location of the terminal device to a message (hereinafter referred to as target message), the user can trigger, via an input (hereinafter referred to as fifth input) on a location control (hereinafter referred to as target location control) in a setting option (hereinafter referred to as target setting option) that is on the message setting interface and that corresponds to the target message, the terminal device to add the target location information to the target message.

Figure 9:
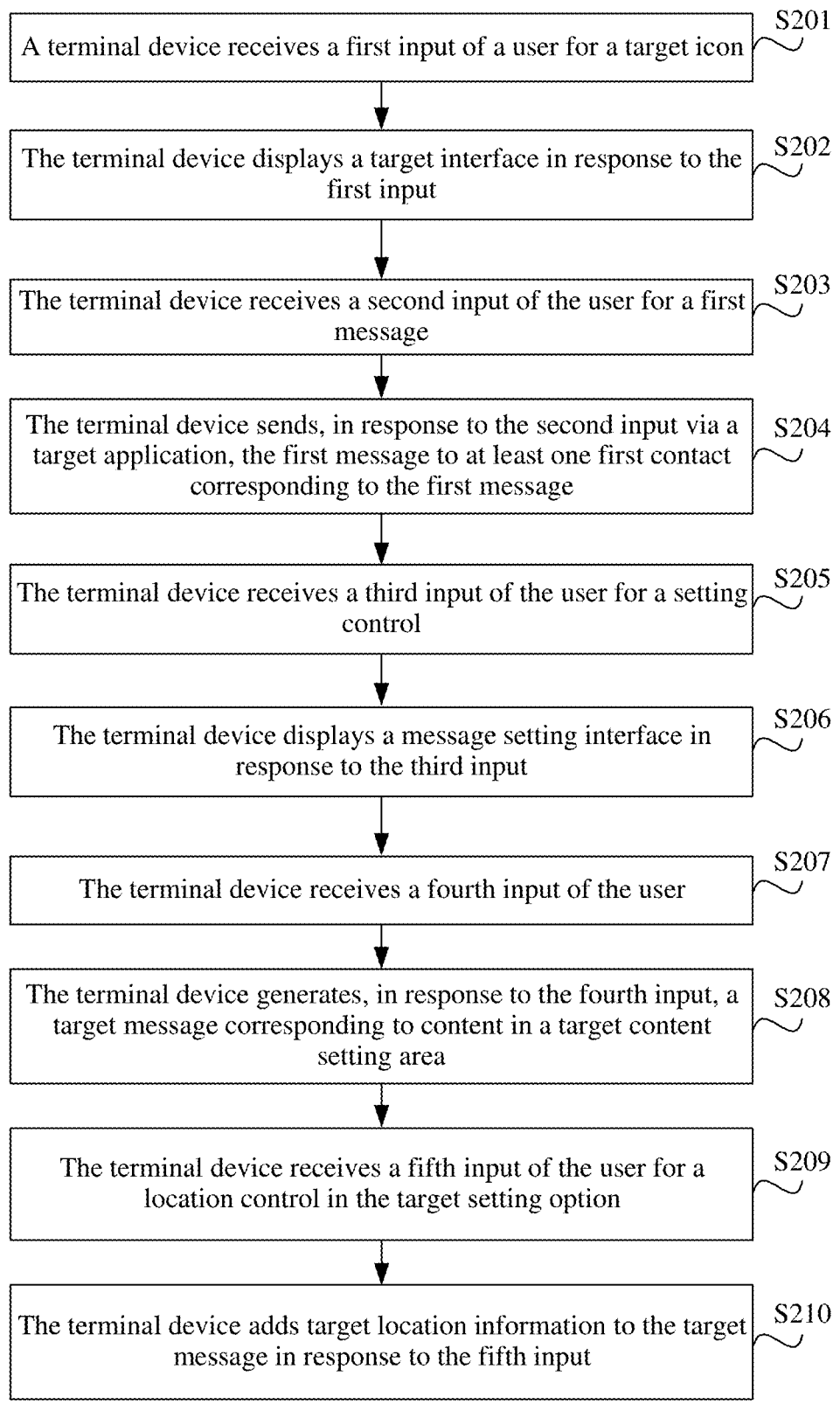
FIG. 9 is a schematic diagram 4 of a message sending method according to an embodiment of the present disclosure.

For example, with reference to FIG. 6, as shown in FIG. 9, after step 5208, the message sending method provided in this embodiment of the present disclosure may further include the following steps S209 and S210:

S209: The terminal device receives a fifth input of the user on a location control in the target setting option.

S210: The terminal device adds target location information to the target message in response to the fifth input.

The target location information may be used to indicate a location of the terminal device.

In this embodiment of the present disclosure, one of the at least one message (namely, the target message) is used as an example. After displaying the message setting interface, the terminal device can receive a fifth input of the user on a location control (namely, the target location control) in a setting option (namely, the target setting option) corresponding to the target message, and add location information (namely, the target location information) to the target message in response to the fifth input.

Optionally, in this embodiment of the present disclosure, the fifth input may be any possible input such as a single-click input, a double-click input, or a long-press input of the user on a location control in the target setting option. This may be specifically determined according to an actual usage requirement, and is not limited in the embodiments of the present disclosure.

Figure 10A:
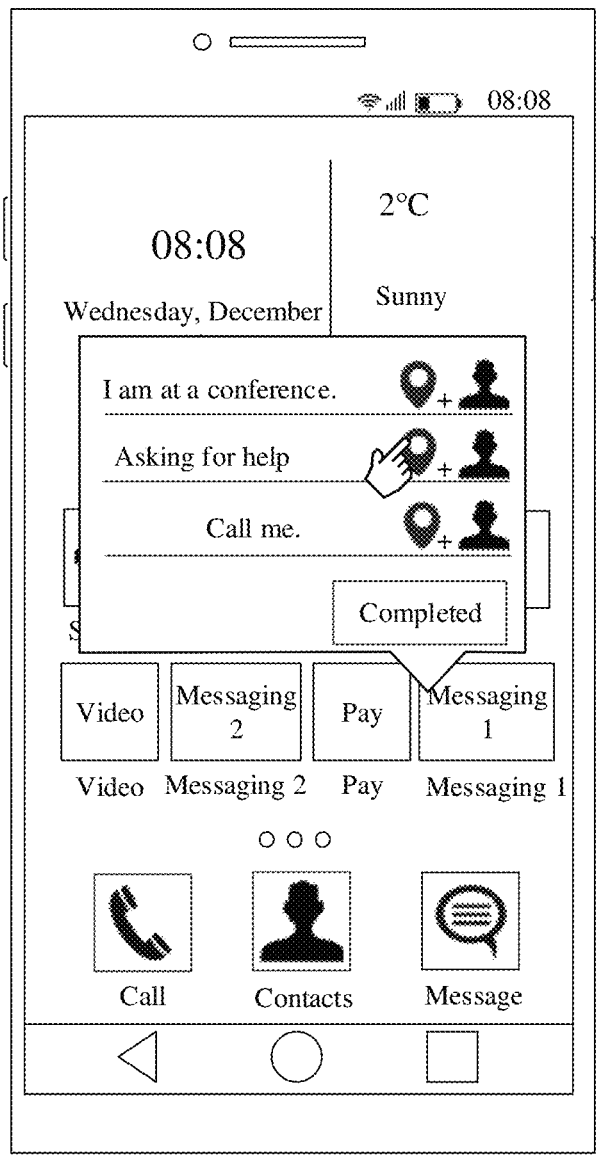
FIG. 10A is schematic diagram 9 of an interface to which a message sending method according to an embodiment of the present disclosure is applied.
Figure 10B:
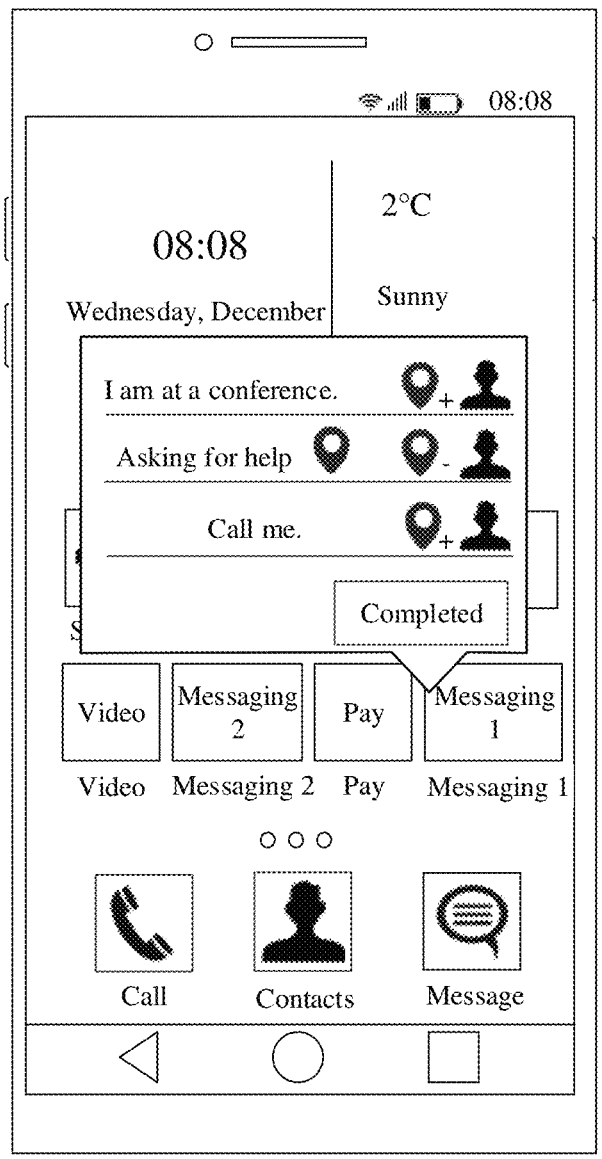
FIG. 10B is schematic diagram 10 of an interface to which a message sending method according to an embodiment of the present disclosure is applied.

For example, in this embodiment of the present disclosure, it is assumed that the target message is "Asking for help". As shown in FIG. 10A, when displaying the message setting interface, the terminal device can receive an input (namely, the fifth input) of the user on a location control in a setting option corresponding to the message "Asking for help", and trigger, in response to the fifth input, as shown in FIG. 10B, the terminal device to add location information (indicated by a map marker or location identifier in FIG. 10B) to the message "Asking for help".

Optionally, in this embodiment of the present disclosure, when the target message includes target location information, the user can trigger, via an input on a location control in the target setting option, the terminal device to delete the target location information from the target message.

In this embodiment of the present disclosure, if the user needs to add location information (used to indicate a location of the terminal device) to a message (for example, the target message) on the target interface, the user can add the location information (for example, the target location information) to the message via the fifth input, so that the location information can be included in the message. In this way, the user can flexibly set content in each message according to usage requirements of the user.

It should be noted that in this embodiment of the present disclosure, the message sending method shown in each of the foregoing accompanying drawings is described by using an accompanying drawing in this embodiment of the present disclosure as an example. During specific implementation, the message sending method shown in each of the foregoing accompanying drawings may be implemented in combination with any other accompanying drawings illustrated in the foregoing embodiment, and details are not described again in this embodiment.

Figure 11:
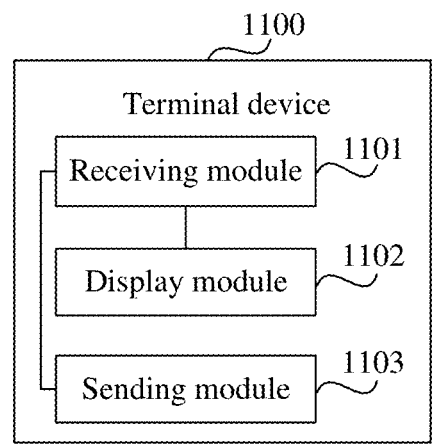
FIG. 11 is a schematic structural diagram 1 of a terminal device according to an embodiment of the present disclosure.

As shown in FIG. 11, an embodiment of the present disclosure provides a terminal device 1100. The terminal device 1100 includes a receiving module 1101, a display module 1102, and a sending module 1103. The receiving module 1101 is configured to receive a first input of a user on a target icon; the display module 1102 is configured to display a target interface in response to the first input received by the receiving module 1101; the receiving module 1101 is further configured to receive a second input of the user on a first message; and the sending module 1103 is configured to send, in response to the second input received by the receiving module 1101 via a target application, the first message to at least one first contact corresponding to the first message. The target icon is used to indicate the target application. The target interface includes at least one message, each of the at least one message corresponds to at least one contact, and the first message is a message in the at least one message.

Optionally, each of the at least one message includes at least one of content information or location information, and content information of one message includes at least one of text information, image information, emoticon information, or voice information.

Optionally, the first message includes first content information and first location information. The first location information is used to indicate a location where the terminal device is located when the terminal device receives a second input. The sending module 1103 may be configured to send the first location information to the at least one first contact after sending the first content information to the at least one first contact.

Optionally, the target interface further includes a setting control. The receiving module 1101 is further configured to receive a third input of the user on the setting control. The display module 1102 is further configured to display a message setting interface in response to the third input received by the receiving module 1101, where the message setting interface is used to set the at least one message.

Figure 12:
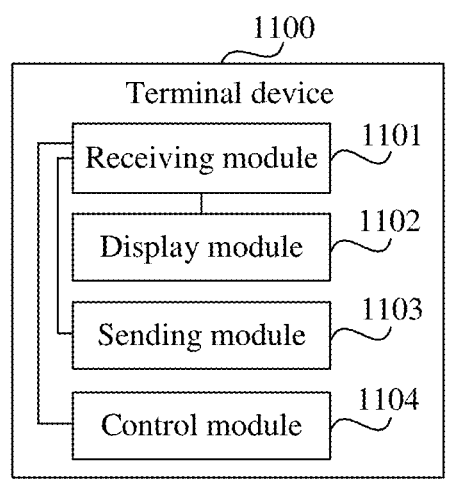
FIG. 12 is a schematic structural diagram 2 of a terminal device according to an embodiment of the present disclosure.

Optionally, the message setting interface includes at least one setting option, and each setting option includes a content setting area and a contact control. With reference to FIG. 11, as shown in FIG. 12, the terminal device 1100 further includes a control module 1104. The receiving module 1101 is further configured to receive a fourth input of the user. The control module 1104 is configured to generate, in response to the fourth input received by the receiving module 1101, a target message corresponding to content in the content setting area. The fourth input is an input on a target object in a target setting option, the target setting option is a setting option in the at least one setting option, and the target object includes at least one of a content setting area or a contact control.

Optionally, each of the at least one setting option further includes a location control. The receiving module 1101 is further configured to receive a fifth input of the user on a location control in the target setting option. The control module 1104 is further configured to add target location information to the target message in response to the fifth input received by the receiving module 1101, where the target location information is used to indicate a location of the terminal device.

The terminal device provided in this embodiment of the present disclosure can implement the processes that are implemented by the terminal device in the foregoing message sending method embodiment, and the same technical effects can be achieved. To avoid repetition, details are not described herein again.

According to the terminal device provided in this embodiment of the present disclosure, after the user performs the first input on the target icon indicating the target application, the terminal device can display pre-edited messages (each of these messages corresponds to at least one contact, namely contacts to which these messages are to be sent) to the user. Therefore, after the user selects a message (namely, the second input of the user) from these messages, the terminal device can be triggered to send the message to a contact corresponding to the message. In this way, when the user sends a message by using the terminal device, steps to be performed by the terminal device for sending the message can be reduced, so that the terminal device can quickly send the message, further improving efficiency of the terminal device in sending messages.

Figure 13:
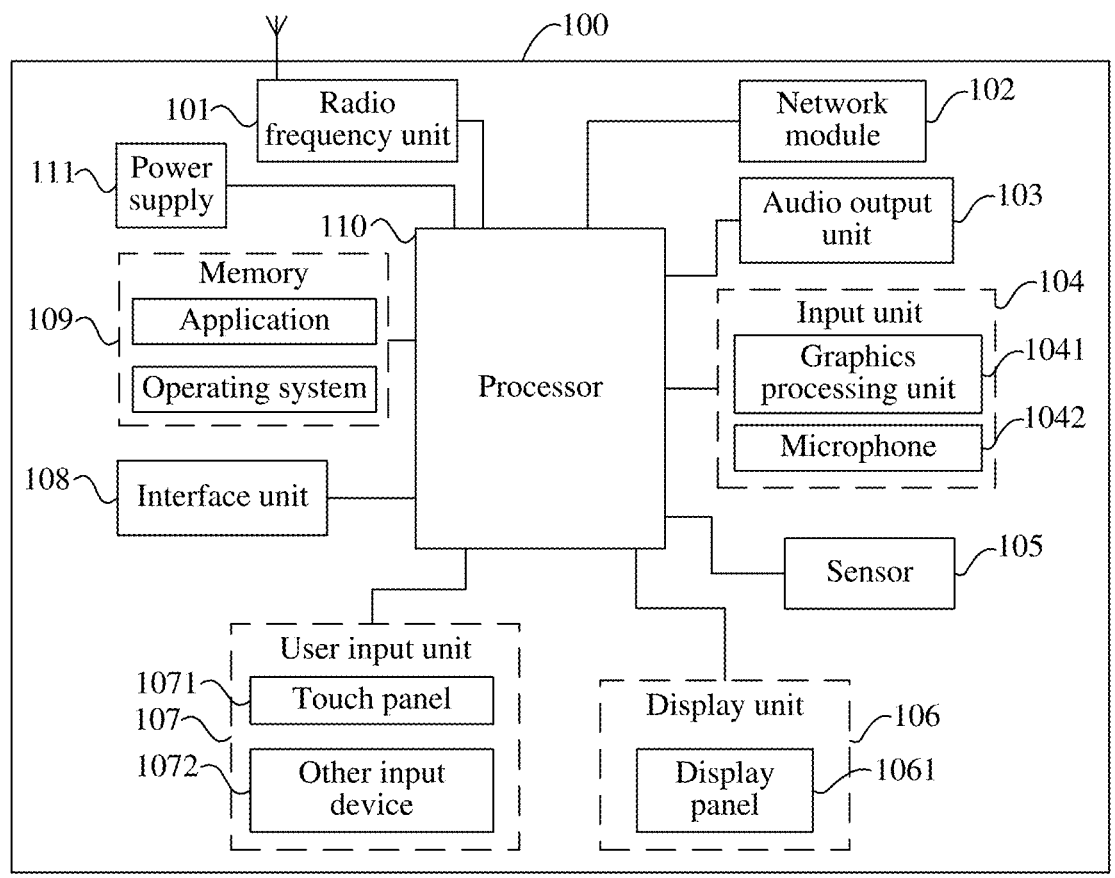
FIG. 13 is a schematic diagram of hardware of a terminal device according to an embodiment of the present disclosure.

FIG. 13 is a schematic diagram of hardware of a terminal device implementing the embodiments of the present disclosure. As shown in FIG. 13, the terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal device shown in FIG. 13 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The user input unit 107 is configured to receive a first input of a user on a target icon; the display unit 106 is configured to display a target interface in response to the first input received by the user input unit 107; the user input unit 107 is further configured to receive a second input of the user on the first message; and the processor 110 is configured to send, in response to the second input received by the user input unit 107 via a target application, the first message to at least one first contact corresponding to the first message. The target icon is used to indicate the target application. The target interface includes at least one message, each of the at least one message corresponds to at least one contact, and the first message is a message in the at least one message.

According to the terminal device provided in this embodiment of the present disclosure, after the user performs the first input on the target icon indicating the target application, the terminal device can display pre-edited messages (each of these messages corresponds to at least one contact, namely contacts to which these messages are to be sent) to the user. Therefore, after the user selects a message (namely, the second input of the user) from these messages, the terminal device can be triggered to send the message to a contact corresponding to the message. In this way, when the user sends a message by using the terminal device, steps to be performed by the terminal device for sending the message can be reduced, so that the terminal device can quickly send the message, further improving efficiency of the terminal device in sending messages.

It should be understood that, in this embodiment of the present disclosure, the radio frequency unit 101 may be configured to receive and transmit information, or receive and transmit signals during a call. For example, the radio frequency unit 101 receives downlink data from a base station, and transmits the downlink data to the processor 110 for processing; and in addition, transmits uplink data to the base station. Usually, the radio frequency unit 101 includes, but not limited to, an antenna, at least one amplifier, a transceiver, a coupler, a low noise amplifier, and a duplexer. In addition, the radio frequency unit 101 may also communicate with a network and another device through a radio communications system.

The terminal device provides a user with wireless broadband Internet access through the network module 102, for example, helps the user send and receive emails, browse web pages, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capture apparatus (for example, a camera) in video capture mode or image capture mode. The processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such sound into audio data. The processed audio data may be converted, in a call mode, into a format that can be sent to a mobile communication base station by using the radio frequency unit 101 for output.

The terminal device 100 further includes at least one sensor 105, such as an optical sensor, a motion sensor, and other sensors. The optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information input by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device. The user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 110, and can receive and execute a command sent by the processor 110. In addition, the touch panel 1071 may be of a resistive type, a capacitive type, an infrared type, a surface acoustic wave type, or the like. In addition to the touch panel 1071, the user input unit 107 may further include the another input device 1072. The another input device 1072 may include, but are not limited to, a physical keyboard, a functional button (such as a volume control button or a power on/off button), a trackball, a mouse, and a joystick. Details are not described herein again.

Optionally, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 13, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application, and the like. The modem processor mainly processes wireless communications. It may be understood that the foregoing modem processor may not be integrated into the processor 110.

The terminal device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the terminal device 100 includes some function modules not shown, and details are not described herein.

Optionally, an embodiment of the present disclosure further provides a terminal device, including the processor 110 and the memory 109 that are shown in FIG. 13, and a computer program stored in the memory 109 and executable on the processor 110, where the computer program, when executed by the processor 110, implements the processes of the foregoing embodiments of the message sending method, and the same technical effects can be achieved. To avoid repetition, details are not described herein again.

The embodiments of the present disclosure further provide a non-transitory computer-readable storage medium. The non-transitory computer-readable storage medium stores a computer program, and when a processor executes the computer program, the processes of the foregoing method embodiment are implemented, and the same technical effects can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A message sending method, applied to a terminal device, and comprising:
   receiving a first input of a user on a target icon, wherein the target icon is used to indicate a target application;
   displaying a target interface in response to the first input, wherein the target interface comprises at least one message and a setting control, and each of the at least one message corresponds to at least one contact;
   receiving a second input of the user on a first message, wherein the first message is a message in the at least one message;
   sending, in response to the second input via the target application, the first message to at least one first contact corresponding to the first message;
   receiving a third input of the user on the setting control; and
   displaying a message setting interface in response to the third input, wherein the message setting interface is used to set the at least one message;
   wherein:
      the message setting interface comprises at least one setting option, and each setting option comprises a content setting area and a contact control; and
   the method further comprises:
      receiving a fourth input of the user, wherein the fourth input is an input on a target object in a target setting option, the target setting option is a setting option in the at least one setting option, and the target object comprises at least one of a content setting area or a contact control; and
      generating, in response to the fourth input, a target message corresponding to content in the content setting area.

2. The method according to claim 1, wherein each message comprises at least one of content information or location information, and content information of one message comprises at least one of text information, image information, emoticon information, or voice information.

3. The method according to claim 2, wherein the first message comprises first content information and first location information, and the first location information is used to indicate a location where the terminal device is located when the terminal device receives the second input; and
   the sending the first message to at least one first contact corresponding to the first message comprises:
      sending the first location information to the at least one first contact after sending the first content information to the at least one first contact.

4. The method according to claim 1, wherein each setting option further comprises a location control; and the method further comprises:
   receiving a fifth input of the user on a location control in the target setting option; and
   adding target location information to the target message in response to the fifth input, wherein the target location information is used to indicate a location of the terminal device.

5. A terminal device, comprising a processor, a memory, and a computer program that is stored in the memory and that can run on the processor, wherein the computer program, when executed by the processor, causes the terminal device to perform:
   receiving a first input of a user on a target icon, wherein the target icon is used to indicate a target application;
   displaying a target interface in response to the first input, wherein the target interface comprises at least one message and a setting control, and each of the at least one message corresponds to at least one contact;
   receiving a second input of the user on a first message, wherein the first message is a message in the at least one message;
   sending, in response to the second input via the target application, the first message to at least one first contact corresponding to the first message;
   receiving a third input of the user on the setting control; and
   displaying a message setting interface in response to the third input, wherein the message setting interface is used to set the at least one message;
   wherein:
      the message setting interface comprises at least one setting option, and each setting option comprises a content setting area and a contact control; and
      the computer program, when executed by the processor, causes the terminal device to further perform:
         receiving a fourth input of the user, wherein the fourth input is an input on a target object in a target setting option, the target setting option is a setting option in the at least one setting option, and the target object comprises at least one of a content setting area or a contact control; and
         generating, in response to the fourth input, a target message corresponding to content in the content setting area.

6. The terminal device according to claim 5, wherein each message comprises at least one of content information or location information, and content information of one message comprises at least one of text information, image information, emoticon information, or voice information.

7. The terminal device according to claim 6, wherein the first message comprises first content information and first location information, and the first location information is used to indicate a location where the terminal device is located when the terminal device receives the second input; and
   the computer program, when executed by the processor, causes the terminal device to perform:
      sending the first location information to the at least one first contact after sending the first content information to the at least one first contact.

8. The terminal device according to claim 5, wherein each setting option further comprises a location control; and the computer program, when executed by the processor, causes the terminal device to further perform:

receiving a fifth input of the user on a location control in the target setting option; and adding target location information to the target message in response to the fifth input, wherein the target location information is used to indicate a location of the terminal device.

9. A non-transitory computer-readable storage medium, wherein the non-transitory computer-readable storage medium stores a computer program, and the computer program, when executed by a processor, causes the processor to perform:

receiving a first input of a user on a target icon, wherein the target icon is used to indicate a target application;

displaying a target interface in response to the first input, wherein the target interface comprises at least one message and a setting control, and each of the at least one message corresponds to at least one contact;

receiving a second input of the user on a first message, wherein the first message is a message in the at least one message;

sending, in response to the second input via the target application, the first message to at least one first contact corresponding to the first message;

receiving a third input of the user on the setting control; and displaying a message setting interface in response to the third input, wherein the message setting interface is used to set the at least one message;

wherein:

the message setting interface comprises at least one setting option, and each setting option comprises a content setting area and a contact control; and the computer program, when executed by the processor, causes the processor to further perform:

receiving a fourth input of the user, wherein the fourth input is an input on a target object in a target setting option, the target setting option is a setting option in the at least one setting option, and the target object comprises at least one of a content setting area or a contact control; and generating, in response to the fourth input, a target message corresponding to content in the content setting area.

10. The non-transitory computer-readable storage medium according to claim 9, wherein each message comprises at least one of content information or location information, and content information of one message comprises at least one of text information, image information, emoticon information, or voice information.

11. The non-transitory computer-readable storage medium according to claim 10, wherein the first message comprises first content information and first location information, and the first location information is used to indicate a location where the terminal device is located when the terminal device receives the second input; and the computer program, when executed by the processor, causes the processor to perform:

sending the first location information to the at least one first contact after sending the first content information to the at least one first contact.

12. The non-transitory computer-readable storage medium according to claim 9, wherein each setting option further comprises a location control; and the computer program, when executed by the processor, causes the processor to further perform:

receiving a fifth input of the user on a location control in the target setting option; and adding target location information to the target message in response to the fifth input, wherein the target location information is used to indicate a location of the terminal device.

\* \* \* \* \*